United States Patent
Nasreddine et al.

(10) Patent No.: US 9,023,936 B2
(45) Date of Patent: May 5, 2015

(54) HNBR COMPOSITIONS WITH VERY HIGH FILLER LEVELS HAVING EXCELLENT PROCESSABILITY AND RESISTANCE TO AGGRESSIVE FLUIDS

(75) Inventors: Victor Nasreddine, Cranberry Township, PA (US); Matthias Soddemann, Schattdorf (CH)

(73) Assignee: LANXESS Deutschland GmbH, Cologne, DE (US)

( * ) Notice: Subject to any disclaimer, the term of this patent is extended or adjusted under 35 U.S.C. 154(b) by 996 days.

(21) Appl. No.: 13/062,763

(22) PCT Filed: Sep. 10, 2009

(86) PCT No.: PCT/US2009/056465
§ 371 (c)(1),
(2), (4) Date: Oct. 26, 2011

(87) PCT Pub. No.: WO2010/030747
PCT Pub. Date: Mar. 18, 2010

(65) Prior Publication Data
US 2012/0041126 A1  Feb. 16, 2012

Related U.S. Application Data

(60) Provisional application No. 61/096,356, filed on Sep. 12, 2008.

(51) Int. Cl.
C08L 55/00 (2006.01)
C08K 3/00 (2006.01)
C08L 15/00 (2006.01)

(52) U.S. Cl.
CPC ............. C08K 3/0033 (2013.01); C08L 15/005 (2013.01)

(58) Field of Classification Search
CPC ............................ C08K 3/0033; C08L 5/0051
USPC .................................................. 524/565, 566
See application file for complete search history.

(56) References Cited

U.S. PATENT DOCUMENTS

| | | |
|---|---|---|
| 5,391,627 A | 2/1995 | Araki et al. |
| 6,489,385 B1 | 12/2002 | Fujii et al. |
| 7,875,683 B2 | 1/2011 | Obrecht et al. |
| 2002/0183427 A1 | 12/2002 | Yamaguchi |
| 2003/0176587 A1 | 9/2003 | Guerin et al. |
| 2004/0110888 A1 | 6/2004 | Guerin et al. |
| 2005/0101717 A1 | 5/2005 | Pazur et al. |
| 2005/0101736 A1 | 5/2005 | Guerin et al. |
| 2005/0245666 A1* | 11/2005 | Yamanaka ................... 524/495 |
| 2007/0299200 A1* | 12/2007 | Kobayashi et al. ........... 524/555 |
| 2008/0139709 A1* | 6/2008 | Piccirilli et al. ................ 524/99 |
| 2008/0242771 A1 | 10/2008 | Kulbaba et al. |

FOREIGN PATENT DOCUMENTS

| | | |
|---|---|---|
| CA | 2558900 A1 | 3/2007 |
| EP | 1743918 B1 | 5/2008 |
| EP | 1591481 B1 | 3/2010 |
| EP | 1808458 B1 | 2/2011 |
| JP | 1180426 A2 | 7/1989 |
| JP | 2001064459 A | 8/1999 |

OTHER PUBLICATIONS

European Search Report from co-pending Application PCT/US2009/056465 dated Dec. 23, 2009, 3 pages.
Nasreddine, V.; Pazur, R. J.; "HNBR: Fulfilling requirements of auto and heavy duty vehicle applications" Rubber World, vol. 238, No. 1, Apr. 2008 pp. 31-38 XP9127190.
Victor Nasreddine et al: "Low Mooney viscosity HNBR polymers with high acrylonitrile content", Rubber World, vol. 237, No. 5, Feb. 1, 2008, pp. 34-38, XP002550236.
Encyclopedia of Polymer Science & Engineering, vol. 4, p. 66-79 et seq. (Compounding), May 13, 1986.
Encyclopedia of Polymer Science & Engineering, vol. 17. p. 666-698 et seq. (Vulcanization), Jan. 19, 1990.
European Search Report from co-pending Application PCT/US2009056456 dated Dec. 14, 2009, 3 pages.

* cited by examiner

*Primary Examiner* — Peter D Mulcahy

(57) ABSTRACT

The present invention relates to an elastomeric composition containing a nitrile rubber, preferably hydrogenated, and a filler. Compositions according to the present invention have high filler levels, excellent processability, and very good resistance to aggressive fluids and fuels compared to known HNBR compositions.

9 Claims, No Drawings

HNBR COMPOSITIONS WITH VERY HIGH FILLER LEVELS HAVING EXCELLENT PROCESSABILITY AND RESISTANCE TO AGGRESSIVE FLUIDS

FIELD OF THE INVENTION

The present invention relates to an elastomeric composition containing a nitrile rubber, preferably hydrogenated, and a filler. Compositions according to the present invention have high filler levels, excellent processability, and very good resistance to aggressive fluids and fuels compared to known hydrogenated nitrile rubber compositions.

BACKGROUND OF THE INVENTION

There is a continuous demand in the automotive, heavy duty, and chemical industry for high performance elastomers that have improved resistance to aggressive oils and fuels. Hydrogenated nitrile butadiene rubber (HNBR) is a high performance specialty elastomer used in a variety of demanding engineering applications: automotive, chemical and heavy duty industries, oil well exploration, and mining. HNBR, is made by the selective hydrogenation of the double bonds in nitrile rubber. It has a combination of unique properties: high tensile strength and very good mechanical properties even at elevated temperatures, excellent abrasion resistance, low compression set, excellent heat resistance, very good resistance to ozone, weathering, and high energy radiation, low permeability to vapors and gases. In addition, HNBR has very good resistance to oils, fluids, diesel, fuels, sour gasoline, lubricating oils with aggressive alkaline additives, as well as good resistance to crude oil even in the presence of hydrogen sulfide, amines, and corrosion inhibitors.

U.S. Pat. Nos. 7,381,781; 6,841,623; and 6,780,939 assigned to LANXESS recently introduced to the rubber industry a novel HNBR technology that enables the production of low viscosity HNBR polymers, previously commercially impossible to manufacture. The commercial product is sold by LANXESS under the trade name THERBAN® Advanced Technology (AT). These low Mooney viscosity HNBR grades have several benefits over standard HNBR products, including: retention of physical properties known for HNBR polymer plus the added benefit of improved processability; combined with a narrow molecular weight distribution to maintain excellent mechanical properties; faster black incorporation time and lower mix temperature; faster mold filling and shorter cycle times in injection molding; faster output and compounds of smoother surfaces and sharper edges are obtained in extrusion; lower compound costs by using higher fillers levels.

The present invention provides novel HNBR compositions that have very high filler levels resulting in very good mechanical properties, processability, and especially excellent resistance and minimal swelling in fluids known to be aggressive to nitrile polymers such as methyl ethyl ketone (MEK), toluene, and certain fuels. Such compositions and their properties are not known in the art.

SUMMARY OF THE INVENTION

The present invention relates to an elastomeric composition containing a nitrile rubber, preferably hydrogenated, and a filler. Compositions according to the present invention have high filler levels, excellent processability, and very good resistance to aggressive fluids and fuels compared to known HNBR compositions.

The present invention also provides a novel HNBR composition containing high acrylonitrile low Mooney viscosity HNBR polymers and high filler levers. The resulting compositions have very good mechanical properties, processability, and especially excellent resistance and minimal swelling in fluids known to be aggressive to nitrile polymers such as methyl ethyl ketone (MEK) and toluene.

The novel HNBR compositions of the present invention enable the use of HNBR in new applications requiring resistance to these media as well as in a variety of fuels such as gasoline, flex-fuel, and biodiesel. Such compositions and their properties are not known in the art.

DETAILED DESCRIPTION OF THE INVENTION

The present invention therefore provides for an elastomer composition containing a nitrile rubber, preferably hydrogenated, and a filler.

As used throughout this specification, the term "nitrile rubber" or NBR is intended to have a broad meaning and is meant to encompass a copolymer having repeating units derived from at least one conjugated diene, at least one $\alpha,\beta$-unsaturated nitrile and optionally further one or more copolymerizable monomers. The conjugated diene may be any known conjugated diene such as a $C_4$-$C_6$ conjugated diene. Preferred conjugated dienes include butadiene, isoprene, piperylene, 2,3-dimethyl butadiene and mixtures thereof. More preferred $C_4$-$C_6$ conjugated dienes are butadiene, isoprene and mixtures thereof. The most preferred $C_4$-$C_6$ conjugated diene is butadiene. The $\alpha,\beta$-unsaturated nitrile may be any known $\alpha,\beta$-unsaturated nitrile, such as a $C_3$-$C_5$ $\alpha,\beta$-unsaturated nitrile. Preferred $C_3$-$C_5$ $\alpha,\beta$-unsaturated nitriles include acrylonitrile, methacrylonitrile, ethacrylonitrile and mixtures thereof. The most preferred C3-C5 $\alpha,\beta$-unsaturated nitrile is acrylonitrile. The preparation of nitrile rubbers via polymerization of the above referenced monomers is well known to a person skilled in the art and is extensively described in the literature (i.e, Houben-Weyl, Methoden der Organischen Chemie, Vol. 14/1, Georg Thieme Verlag Stuttgart, 1961).

Hydrogenated in this invention is preferably understood to more than 50% of the residual double bonds (RDB) present in the starting nitrile polymer/NBR being hydrogenated, preferably more than 90% of the RDB are hydrogenated, more preferably more than 95% of the RDB are hydrogenated and most preferably more than 99% of the RDB are hydrogenated. The hydrogenation of nitrile rubber is well known in the art and described in, for example, U.S. Pat. No. 3,700,637, U.S. Pat. No. 4,464,515 and U.S. Pat. No. 4,503,196.

The present invention also includes the use of carboxylated nitrile rubbers. As used throughout this specification, the term "carboxylated nitrile rubber" or XNBR is intended to have a broad meaning and is meant to encompass a copolymer having repeating units derived from at least one conjugated diene, at least one $\alpha,\beta$-unsaturated nitrile, at least one alpha-beta-unsaturated carboxylic acid or alpha-beta-unsaturated carboxylic acid derivative and optionally further one or more copolymerizable monomers $\alpha,\beta$-unsaturated mono- or dicarboxylic acids, or their esters or amides. Preferred $\alpha,\beta$-unsaturated mono- or dicarboxylic acids here are fumaric acid, maleic acid, acrylic acid and methacrylic acid. Preferred esters used of the $\alpha,\beta$-unsaturated carboxylic acids are their alkyl esters and alkoxyalkyl esters. Particularly preferred esters of the $\alpha,\beta$-unsaturated carboxylic acids are methyl acrylate, ethyl acrylate, butyl acrylate, butyl methacrylate, 2-ethylhexyl acrylate, 2-ethylhexyl methacrylate and octyl acrylate.

Suitable nitrile rubbers according to the present invention include low Mooney viscosity hydrogenated nitrile rubbers. Suitable rubbers have a Mooney viscosity of below 55 (ML 1+4 100 C). Preferably the low Mooney viscosity polymers have a Mooney viscosity between 0-55. More preferably, the low Mooney viscosity polymers have a Mooney viscosity between 5-50, most preferably between 10-40. Even more preferably, the low Mooney viscosity polymers have a Mooney viscosity below 30 and even more preferably below 10. Suitable low Mooney viscosity polymers can be prepared by processes disclosed in U.S. Pat. No. 7,381,781, U.S. Pat. No. 6,841,623 and U.S. Pat. No. 6,780,939. The subject matter thereof being incorporated by reference.

Suitable nitrile rubbers according to the present invention should have a medium to high acrylonitrile content (ACN) for an acceptable degree of fluid and fuel resistance. Preferably, the nitrile rubbers according to the present invention have a acrylonitrile content greater than 15%, more preferably greater than 30%, even more preferably greater than 39% and most preferably, greater than 43%. Suitable nitrile rubbers are partially or fully hydrogenated and contain less than 10% of residual double bonds. Preferably, the nitrile rubbers are fully saturated and contain less than 1% of residual double bonds.

The composition of the present invention includes the use of high filler levels, including high white filler levels and/or black filler levels. According to the present invention, black fillers, such as carbon black is present in the composition in an amount of in the range of from 200 to 500 phr (parts per hundred rubber), preferably in the range of from 250 to 350 phr. The carbon blacks useful in the present invention are preferably prepared by the lamp black, furnace black or gas black process and have preferably BET (DIN 66 131) specific surface areas in the range of from 20 to 200 m2/g, e.g. SAF, ISAF, HAF, FEF or GPF carbon blacks.

Compositions of the present invention also include the use of over 100 phr of white fillers. Suitable white mineral fillers for use in the present invention include:

highly dispersed silicas, prepared e.g. by the precipitation of silicate solutions or the flame hydrolysis of silicon halides, with specific surface areas of in the range of from 5 to 1000 m2/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m2/g and primary particle diameters in the range of from 10 to 400 nm;

natural silicates, such as kaolin and other naturally occurring silica;

glass fibers and glass fiber products (matting, extrudates) or glass microspheres;

Preferred white fillers are acircular or nonisometric materials with an aspect ratio of 2:1 to 200:1 (including clays, talcs, micas). The aspect ratio of these platy materials is defined as the ratio of mean diameter of a circle of the same area as the face of the plate to the mean thickness of the plate. More preferable are needle-like structures with an aspect ratio of 2:1 to 20:1. The aspect ratio of for needle and fiber shaped fillers is the ratio of length to diameter.

Composition according to the present invention may also include the use of synergistic stabilizer system. Suitable systems include those disclosed in U.S. Patent Publication Nos. 2003/176587(A1), 2001/0018479, 2003/0170549, 2004/0992634 and 2005/014352; the subject matter thereof being incorporated herein by reference.

The composition according to the present invention can also include the use of acid acceptors such as metal oxides including magnesium oxide, calcium oxide, and carbonates with alkaline pH. The acid acceptor is added to the composition of the present invention in an amount in the range of 0-200 phr, more preferably 0-100 phr, and most preferably 0-10 phr.

The rubber elastomer according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 phr.

According to the present invention, the composition can contain in the range of 0.1 to 20 phr of an organic fatty acid as an auxiliary product, such as a unsaturated fatty acid having one, two or more carbon double bonds in the molecule which more preferably includes 10% by weight or more of a conjugated diene acid having at least one conjugated carbon-carbon double bond in its molecule. Those fatty acids can have in the range of from 8-22 carbon atoms, or for example from 12-18. Examples include stearic acid, palmitic acid and oleic acid and their calcium-, zinc-, magnesium-, potassium- and ammonium salts.

According to the present invention, the composition can contain in the range of 5 to 50 phr of an acrylate as an auxiliary product. Suitable acrylates are known from EP-A1-0 319 320, in particular p. 3, l. 16 to 35, from U.S. Pat. No. 5,208,294, see Col. 2, l. 25 to 40, and from U.S. Pat. No. 4,983,678, in particular Col. 2, l. 45 to 62. Reference is made to zinc acrylate, zinc diacrylate or zinc dimethacrylate or a liquid acrylate, such as trimethyloipropane-trimethacrylate (TRIM), butanedioldimethacrylate (BDMA) and ethylengly-coldimethacrylate (EDMA). It might be advantageous to use a combination of different acrylates and/or metal salts thereof. It may also be advantageous to use metal acrylates in combination with a Scorch-retarder such as sterically hindered phenols (e.g. methyl-substituted aminoalkylphenols, such as 2,6-di-tert.-butyl-4-dimethylaminomethylphenol).

An antioxidant may be used in preparing a compound according to the present invention. Examples of suitable antioxidants include p-dicumyl diphenylamine (NAUGARD® 445), VULKANOX® DDA (a diphenylamine derivative), VULKANOX® ZMB2 (zinc salt of methylmercapto benzimidazole), VULKANOX® HS (polymerized 1,2-dihydro-2, 2,4-trimethyl quinoline) and IRGANOX® 1035 (thiodiethylene bis(3,5-di-tert.-butyl-4-hydroxy) hydrocinnamate or thiodiethylene bis(3-(3,5-di-tert-butyl-4-hydroxyphenyl) propionate supplied by Ciba-Geigy. VULKANOX is a trademark of Bayer AG.

Similarly, in preparing compounds according to the present invention it is useful to employ a crosslinking agent, including commercially available agents including sulfur/sulfur accelerator systems, diamines and peroxides. Most preferred are the peroxide based vulcanizing agents due to the excellent thermal stability conveyed by the carbon-carbon linkages between polymer chains. Useful peroxide crosslinking agents, include dicumyl peroxide (Di-Cup 40KE), di-tert.-butyl peroxide, benzoyl peroxide, 2,2'-bis (tert.-butylperoxy diisopropylbenzene (VULCUP® 40KE), benzoyl peroxide, 2,5-dimethyl-2,5-di (tert-butylperoxy)-hexyne-3, 2,5-dimethyl-2,5-di(benzoylperoxy)hexane, (2,5-bis(tert.-butylperoxy)-2,5-dimethyl hexane and the like. Preferred curing agents are readily determined by means of a few preliminary experiments, which is within the scope of one skilled in the art. A preferred peroxide curing agent is commercially available under the tradename Di-Cup 40KE. The peroxide curing agent (60% active) is suitably used in an amount of 0.1 to 15 parts per hundred parts of rubber (phr), preferably 4 to 10 phr. Too much peroxide may lead to undesirably violent reaction.

Vulcanizing co-agents can also be added to the composition of the present invention. Mention is made of triallyl isocyanurate (TAIC), commercially available under the trademark DIAK 7 from DuPont Or N,N'-m-phenylene dimaleimide know as HVA-2 (DuPont Dow), triallyl cyanurate (TAC) or liquid polybutadiene known as Ricon D 153 (supplied by SARTOMER). Amounts can be equivalent to the peroxide curative or less, preferably equal.

The present invention also includes the use of activators such as zinc peroxide (50% on an inert carrier) using Struktol ZP 1014 in combination with the peroxide. Amounts can be from 0.1 to 15, preferably from 4 to 10 phr.

The ingredients of the elastomer composition are often mixed together, suitably at an elevated temperature that may range from 25° C. to 200° C. Normally the mixing time does not exceed one hour and a time in the range from 2 to 30 minutes is usually adequate. Mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

The elastomeric composition according to the present invention is especially suitable for injection molding articles such as the present invention relates to shaped articles, such as seals, hoses, bearing pads, stators, well head seals, valve plates, cable sheathing, wheels, rollers, pipe seals, couplings, as well as for alternative fuels applications such as flex-fuels (gasoline-alcohol blends) and biodiesels (i.e., fatty acid methyl esters such as Soybean Methyl Ester/SME and Rapeseed Methyl Ester/RME).

EXAMPLES

Description of Tests

Cure Rheometry:
Vulcanization testing was carried out on a Moving Die Rheometer (MDR 2000(E)) using a frequency of oscillation of 1.7 Hz and a 1° arc at 180° C. for 60 minutes total run time. The test procedure follows ASTM D-5289.

Compound Mooney Viscosity and Scorch:
A large rotor was used for these tests in compliance with the ASTM method D-1646. The compound Mooney viscosity was determined at 100° C. by preheating the sample 1 minute and then, measuring the torque (Mooney viscosity units) after 4 minutes of shearing action caused by the viscometer disk rotating at 2 r.p.m. Mooney scorch measurements taken as the time from the lowest torque value to a rise of 5 Mooney units (t05) were carried out at 135° C.

Stress-Strain:
Samples were prepared by curing a macro sheet at 180° C. for 13 minutes. Afterwards, samples were died out into standard ASTM die C dumbbells. The test was conducted at 23° C. and complies with ASTM D-412 Method A.

Hardness:
All hardness measurements were carried out with an A-2 type durometer following the procedure outlined in ASTM D-2240.

Tear Resistance:
A tensile sheet cured 14 minutes at 180° C. was used to prepare appropriate samples of Die B and Die C geometries. Both tests are designed to give an indication of the resistance to tear of the rubber. The test procedure complies with ASTM D 624.

Din Abrasion:
Abrasion resistance is determined according to test method DIN 53 516. The volume loss by rubbing the rubber specimen with an emery paper of defined abrasive power is measured and reported.

Compression Set:
This testing complies with ASTM D395 (Method B). Solid button type samples were cured for 20 minutes at 180° C. and the sample subjected to a 25% compression deflection during hot air aging.

Preparations of Examples:
A laboratory size Banbury BR-82 (1.6 L capacity) internal mixer cooled at 30° C. was used to prepare the Examples. Rotor speed was held constant during mixing at 50 rpm. At 0 seconds, 1A and 1B (See Table 1) ingredients were added. At 30 seconds, the 1C ingredients were added to the mixer. A sweep was performed at 120 seconds then 1D ingredients were added at 200 seconds followed by a sweep at 320 seconds. The mix was stopped at 420 seconds. The dropped mix was allowed to cool for four hours prior to addition of curatives. The curatives (2A ingredients) were both added on a 10" by 20" two roll mill cooled at 30° C.

TABLE 1

| HNBR formulations with high filler levels. | | | | | | | | |
| --- | --- | --- | --- | --- | --- | --- | --- | --- |
| Formulation (PHR) | | A | B | C | D | E | F | G |
| THERBAN AT A4304 | 1A | 100 | 100 | 100 | 100 | 100 | 100 | 100 |
| NAUGARD 445 | 1B | 1.1 | 1.1 | 1.1 | 1.1 | 1.1 | 1.1 | 1.1 |
| VULKANOX ZMB-2 | 1B | 0.4 | 0.4 | 0.4 | 0.4 | 0.4 | 0.4 | 0.4 |
| MAGLITE D | 1B | 5 | 5 | 5 | 5 | 5 | 5 | 5 |
| KADOC 920C | 1B | 3 | 3 | 3 | 3 | 3 | 3 | 3 |
| N-990 | 1C | 50 | 75 | 100 | 150 | — | — | — |
| ZEOLEX 23 | 1C | — | — | — | — | 50 | — | — |
| HISIL 532 EP | 1C | — | — | — | — | — | 50 | — |

TABLE 1-continued

HNBR formulations with high filler levels.

| Formulation (PHR) | | A | B | C | D | E | F | G |
|---|---|---|---|---|---|---|---|---|
| MINSTRON vapor talc | 1C | — | — | — | — | — | — | 50 |
| STRUKTOL SCA 972 | 1C | — | — | — | — | 5 | 5 | 5 |
| PLASTHALL 226 | 1C | 10 | 10 | 10 | 10 | 10 | 10 | 10 |
| N-990 | 1D | 50 | 75 | 100 | 150 | — | — | — |
| ZEOLEX 23 | 1D | — | — | — | — | 50 | 50 | 50 |
| STRUKTOL SCA 972 | 1D | — | — | — | — | 5 | 5 | 5 |
| PLASTHALL TOTM | 1D | 10 | 10 | 10 | 10 | 10 | 10 | 10 |
| DIAK 7 | 2A | 1.5 | 1.5 | 1.5 | 1.5 | 1.5 | 1.5 | 1.5 |
| VULCUP 40KE | 2A | 11 | 11 | 11 | 11 | 11 | 11 | 11 |
| Mooney Viscosity, ML(1 + 4) @ 100 C. | | 33 | 42 | 61 | 111 | 51 | 61 | 42 |
| Mooney scorch, MS, Large @ 135 C., t05 (min) | | 17 | 16 | 14 | 16 | 15 | 17 | 12 |
| MDR | | | | | | | | |
| MH (dN·m) | | 32.2 | 40.2 | 48.6 | 64.3 | 53.9 | 52.7 | 44.5 |
| ML (dN·m) | | 0.40 | 0.46 | 0.79 | 1.77 | 1.28 | 1.84 | 0.77 |
| DELTA MH-ML (dN·m) | | 31.8 | 39.7 | 47.8 | 62.5 | 52.6 | 50.8 | 43.8 |
| t' 95 (min) | | 5.47 | 5.77 | 5.92 | 6.02 | 4.23 | 3.55 | 5.03 |
| Stress strain | | | | | | | | |
| Hardness Shore A2 (pts.) | | 66 | 76 | 85 | 92 | 84 | 87 | 85 |
| Ultimate Tensile (MPa) | | 16.2 | 15.5 | 13.7 | 12.2 | 19.1 | 20.7 | 19.2 |
| Ultimate Elongation (%) | | 305 | 223 | 169 | 93 | 156 | 155 | 165 |
| Stress @ 100 (MPa) | | 4.6 | 7.8 | 12.1 | — | 13.2 | 14 | 15.6 |
| DIE C TEAR | | | | | | | | |
| Tear Strength (kN/m), 23 C. | | 34 | 35.2 | 35.1 | 32.7 | 34.7 | 35.1 | 37.2 |
| Tear Strength (kN/m), 150 C. | | 8.9 | 8.2 | 10.1 | 9.5 | 13.3 | 13.9 | 16.7 |
| Compression @ 150 C. | | | | | | | | |
| 168 hrs | | 32 | 30 | 25 | 25 | 41 | 40 | 38 |
| 504 hrs | | 51 | 40 | 43 | 43 | 52 | 54 | 52 |
| Fluid aging 70 hrs/23 C., MEK | | | | | | | | |
| Chg. Hard. Shore A2 (pts.) | | −15 | −18 | −19 | −20 | −16 | −17 | −15 |
| Chg. Ulti. Tens. (%) | | −64 | −41 | −33 | −18 | −47 | −44 | −39 |
| Chg. Ulti. Elong. (%) | | −61 | −45 | −43 | −23 | −44 | −44 | −54 |
| Vol. Change (%) | | 58 | 46 | 35 | 25 | 32 | 28 | 38 |
| 70 hrs/23 C., TOLUENE | | | | | | | | |
| Chg. Hard. Shore A2 (pts.) | | −15 | −18 | −19 | −20 | −15 | −18 | −13 |
| Chg. Ulti. Tens. (%) | | −54 | −43 | −28 | −8 | −48 | −47 | −34 |
| Chg. Ulti. Elong. (%) | | −52 | −40 | −35 | −23 | −46 | −45 | −48 |
| Vol. Change (%) | | 47 | 38 | 31 | 26 | 37 | 35 | 40 |
| 70 hrs/40 C., FUELC | | | | | | | | |
| Chg. Hard. Shore A2 (pts.) | | −11 | −13 | −13 | −13 | −11 | −12 | −10 |
| Chg. Ulti. Tens. (%) | | −31 | −23 | −9 | −5 | −34 | −31 | −21 |
| Chg. Ulti. Elong. (%) | | −29 | −16 | −14 | −9 | −30 | −28 | −32 |
| Vol. Change (%) | | 20 | 17 | 15 | 12 | 20 | 20 | 22 |

CARBON BLACK N 660 Carbon Black from Cabot Tire Blacks
CARBON BLACK N 990 Carbon Black from Cabot Tire Blacks
DIAK ® #7 Triallylisocyanurate available from R. T. Vanderbilt Company
DISFLAMOL DPK Diphenyl cresyl phosphate plasticizer from LANXESS Deutschland GmbH
EDENOR ® C, 18 98-100 Stearic acid from Cognis Corp
HI-SIL ® 532 EP Precipitated hydrated amorphous silica from PPG Industries
HYCITE ® 713 Magnesium/Aluminum Hydro-talcite from Sued-Chemie AG
KADOX ® 920 Zinc oxide from Horsehead Company
LUVOMAXX CDPA p-dicumyl diphenylamine from Lehmann & Voss Company
MAGLITE ® D Magnesium oxide from Hallstar Innovations Corp.
MISTRON ® VAOPR TALC Magnesium aluminum silicate/talcum from Luzenac America, Inc.
MISTRON ® VAPOR Magnesium silicate (Talc) from Luzenac America Inc.
PERKADOX 14-40 40% active di-(tertbutylperoxyisopropyl) benzene from AKZO Chemie Nederland B.V.
PLASTHALL ® 226 DBEEA from Hallstar Innovations Corp.
PLASTHALL ® TOTM Trioctyl trimellitate available from Hallstar Innovations Corp.
SPIDER SULFUR Sulfur from Hallstar Innovations Corp.
STRUKTOL ® SCA 972 VINYL SILANE from Schill & Seilacher "Struktol" AG
THERBAN ® AT A4304 Low Mooney viscosity HNBR with high acrylonitrile from LANXESS Deutschland GmbH; 43% ACN, 0.9% max RDB, 39 ML(1 + 4) @ 100 C.
THERBAN ® AT A5005 Low Mooney viscosity HNBR with Ultra-high acrylonitrile from LANXESS Deutschland GmbH; 49% ACN, 0.9% max RDB, 55 ML(1 + 4) @ 100 C.
VULKANOX ® ZMB 2/C5 Zinc-4-and 5-methyl-2-mercaptobezimidazole from LANXESS Deutschland GmbH
ZEOLEX ® 23 Synthetic Sodium Aluminum Silicate from J. M. Huber Corporation Table 1 illustrates that up to 30 phr of carbon black filler can be used in the HNBR formulations presented and the compounds have very good processability and scorch safety. The Mooney viscosity increases as a function of filler level and mineral fillers such as HiSil 532 EP, ZEOLEX 23, and Talc result in higher viscosities than carbon black N990.

As the carbon black N990 level increases, hardness increases, tensile decreases, and modulus increases. Even at high fillers levels these black-filled compounds still have good mechanical strength (Ultimate tensile>10 MPa). On the other hand, mineral filled compounds have higher hardness, tensile, and modulus but lower elongation than black-filled compounds. All compounds show excellent tear and compression set properties.

As the N990 level increases, there is a significant improvement in the aging resistance of these HNBR compounds in MEK and toluene demonstrated by better retention in tensile, elongation, and lower swelling (reaching<30%). At the same level, mineral fillers seem to have lower swelling than N990. ZEOLEX 23 and HiSil 532 EP give the lowest swell in MEK and toluene. Increasing the N990 level also results in better tensile and elongation retention as well as lower swelling. All fillers have comparable swell in Fuel C.

TABLE 2

Comparison of High and Ultra-high acrylonitrile HNBR polymers.

| Formulation (PHR) | | H | I |
|---|---|---|---|
| Therban AT A 4304 | 1A | 100 | — |
| Therban AT A 5005VP | 1A | — | 100 |
| LUVOMAXX CDPA | 1B | 1.5 | 1.5 |
| Vulkanox ZMB2 | 1B | 0.5 | 0.5 |
| MAGLITE DE | 1C | 2 | 2 |
| N-990 | 1C | 200 | 200 |
| Hycite 713 | 1C | 15 | 15 |
| DISFLAMOLL DPK | 1C | 30 | 30 |
| DIAK 7 | 2A | 1.5 | 1.5 |
| PERKADOX 14-40 B-PD | 2A | 9.5 | 9.5 |
| Mooney Viscosity, ML(1 + 4)@100 C. | | 53.9 | 59.7 |
| MDR | | | |
| MH (dN · m) | | 39.4 | 36.0 |
| ML (dN · m) | | 0.8 | 1.1 |
| Delta MH-ML (dN · m) | | 38.7 | 34.9 |
| t' 95 (min) | | 7.4 | 8.0 |
| Mooney scorch, MS, Large @ 135 C., t05 (min) | | 19 | 20 |
| Stress strain | | | |
| Hardness Shore A2 (pts.) | | 84 | 86 |
| Ultimate Tensile (MPa) | | 12 | 12 |
| Ultimate Elongation (%) | | 223 | 223 |
| Stress @ 100 (MPa) | | 11 | 11 |
| Fluid aging | | | |
| 168 hrs/100 C. ULSD (Ultra Low Sulfur Diesel) | | | |
| Chg. Hard. Shore A2 (pts.) | | −1.8 | 1.3 |
| Chg. Ulti. Tens. (%) | | −4.9 | −4.1 |
| Chg. Ulti. Elong. (%) | | −12.1 | −7.2 |
| Vol. Change (%) | | 4 | 1.7 |
| 168 hrs/100 C., B100 (100% SME) | | | |
| Chg. Hard. Shore A2 (pts.) | | −2.2 | 1.3 |
| Chg. Ulti. Tens. (%) | | −3.3 | −1.7 |
| Chg. Ulti. Elong. (%) | | −11.7 | −16.1 |
| Vol. Change (%) | | 1.8 | −1.9 |
| 168 hrs/100 C. B20 (20% SME/80% ULSD) | | | |
| Chg. Hard. Shore A2 (pts.) | | −2.4 | 1.3 |
| Chg. Ulti. Tens. (%) | | −6.6 | −4.1 |
| Chg. Ulti. Elong. (%) | | −9.0 | −11.7 |
| Vol. Change (%) | | 4.0 | 1.2 |
| 168 hrs/100 C. B100 (100% SME) | | | |
| Chg. Hard. Shore A2 (pts.) | | −2.2 | 1.3 |
| Chg. Ulti. Tens. (%) | | −3.3 | −1.7 |
| Chg. Ulti. Elong. (%) | | −11.7 | −16.1 |
| Vol. Change (%) | | 1.8 | −1.9 |
| 168 hrs/40 C. E85 (85% Ethanol/15% Fuel C) | | | |
| Chg. Hard. Shore A2 (pts.) | | −15 | −14 |
| Chg. Ulti. Tens. (%) | | −19 | −21 |
| Chg. Ulti. Elong. (%) | | −20 | −17 |
| Vol. Change (%) | | 9 | 5 |

Table 2 shows that the use of these high acrylonitrile content polymers (>39%), and ultra-high acrylonitrile (>43%) low Mooney viscosity polymers with high filler levels is possible and yields very good mechanical and processing properties as well very good performance and minimal swelling in biodiesel and flex-fuel.

The invention claimed is:

1. An elastomeric composition comprising a hydrogenated nitrile rubber (HNBR) and a carbon black filler, wherein the filler is present in an amount of 200 to 500 parts per hundred rubber and wherein the hydrogenated nitrile rubber has a Mooney viscosity of a maximum 55 (ML1+4 @ 100° C.).

2. The composition according to claim 1, wherein the hydrogenated nitrile rubber has a Mooney viscosity below 30 (ML(1+4)@ 100° C.).

3. The composition according to claim 2, wherein the hydrogenated nitrile rubber has a Mooney viscosity below 10 (ML(1+4) @ 100° C.).

4. The composition according to claim 1, wherein the filler is present in an amount in the range of from 250 to 350 phr.

5. The composition according to claim 1, wherein the hydrogenated nitrile rubber is carboxylated.

6. A composition according to claim 1, wherein the hydrogenated nitrile rubber has an acrylonitrile content (ACN) greater than 39%.

7. A composition according to claim 6, wherein the hydrogenated nitrile rubber has an acrylonitrile content (ACN) greater than 43%.

8. A composition according to claim 6, wherein the hydrogenated nitrile rubber is fully saturated and contains less than 1% of residual double bonds.

9. An article comprising the composition according to claim 1, wherein the article has excellent processability and heat resistance of fluids and fuels.

* * * * *